HEINZ SCHARBACH &
RUDI HORSCH,
Inventors

# United States Patent Office 3,563,808
Patented Feb. 16, 1971

3,563,808
TEMPERATURE MEASURING MEANS FOR ENAMEL DEVICES
Heinz Scharbach, Plankstadt, and Rudi Horsch, Schwetzingen, Germany, assignors to Pfaudler-Werke AG., Schwetzingen, Germany, a corporation of Germany
Filed Jan. 17, 1968, Ser. No. 698,489
Claims priority, application Germany, Aug. 11, 1967, P 42,803
Int. Cl. H01v 1/02
U.S. Cl. 136—230　　　　　　　　　　7 Claims

ABSTRACT OF THE DISCLOSURE

A thermocouple is placed on top of a pre-enamelled layer, for example forming the inside of a chemical reaction vessel, and another layer of enamel is applied thereover, fired and fused, so that the thermocouple is embedded within the enamel layer; as an alternative, the thermocouple junction may project slightly beyond the enamel layer, if it is of a material which is non-reactive with the substances the temperature of which is to be sensed.

---

The present invention relates to a temperature measuring arrangement, and more particularly to a temperature measuring arrangement using electrical thermocouples, which are placed within enamelled containers, apparatus and the like.

The chemical industry uses a substantial number of enamelled vessels and apparatus, that is apparatus and devices enamelled with glass or glass-ceramics; additional uses for such apparatus are in the food processing industry. Such vessels are used for the storage and transport of liquids, for chemical reaction of solids, liquids and gases and the like. It is frequently necessary to provide for a temperature measuring device with such enamelled apparatus. It has been customary to provide an opening in the enamelled devices and insert therein enamelled tubes, to serve as a protective insert for mercury thermometers, thermoelements, thermocouples or resistance thermometers. The presence of the protective tube, inserted into the enamelled vessel frequently causes a substantial time lag between indication of a change in temperature and actual change of temperature of the contents of the vessel. Such time lag is undesirable, and may be dangerous in case the vessel is used for chemical processing of exothermic reactions.

It has been proposed to decrease the time lag between measurement of change in temperature and actual change in temperature by forming the thermometer tubes, to be inserted into a vessel, as internal projections which interrupt laminar flow of substances at the inside wall of the vessel, to provide for intimate contact therewith; or to apply thermal sensing elements made of tantalum or gold-platinum. These elements are usually screwed on the reaction vessels and sealed with polytetrafluorethylene or similar cements or sealers. These elements are costly and their application and assembly to chemical vessels is expensive. Additionally, they have to be covered with expensive corrosion-resistant metals when inserted into heated agitator-type reaction vessels subject to high pressure; and such corrosion-resisting metals are often undesirable and the projection of such devices within the inside of the vessel may provide undesirable deposition areas for the products within the interior thereof.

It is an object of the present invention to provide temperature sensing means for use with enamelled vessels which are rapid in response, simple to apply and inexpensive.

SUBJECT MATTER OF THE PRESENT INVENTION

Briefly, in accordance with the present invention, a heat sensitive element is wholly, or partly melted into or fused into the enamelled layer of the vessel. Preferably, the connecting legs of the heat sensitive element are completely melted and fused into the enamelled layer so that only the ends of the connectors need be brought out of the vessel, for example at a connecting or sealing ridge or surface, for connection to the usual electrical measuring devices.

According to a feature of the invention, the temperature measuring device is made by first pre-enamelling the vessel or apparatus in which temperature is to be sensed, to apply a ground or base layer. Thereafter, the thermo element, which may comprise a thermocouple, is applied, for example by adhesion, to the base enamelled layer. Then another base coat, or final coat of enamel is applied thereover, and melted and fused to the first base coat so that the thermoelement, after the second firing, is fixed in its position and covered by enamel. If desired, further coats of enamel of various consistencies, and as governed by the final use of the vessel, can be applied.

It is not necessary that the wires of the thermocouple are welded or soldered together at their junction; they may lie on top of each other to make a mere mechanical contact, since they will both be coverd and fixed in position by the enamelled coat; further, uninsulated bare wires can be used, the insulation between them being provided by the non-conductive enamel coating.

Absence of separate enamelled thermometer tubes, the location of which is fixed, further enables the application of a number of thermal sensing elements, and particularly at points where it was not previously possible to measure temperatures, and to which also thermal sensing elements of gold or platinum could not previously be applied. Locations where the temperature sensing devices of the present invention can be used, where previously it was not possible to measure temperature, are in the inside of enamelled valves, nozzles, or pumps. The possibility to embed the thermocouples in the enamel layer at any desired location of the apparatus or device also avoids difficulties previously encountered when it was desired to sense temperature within a double walled vessel.

The method of fabrication of the temperature sensing devices, in combination with an enamelled device or vessel is simple; the time consuming and careful work required to grind off enamelled layers, bore steel housings and apply the heretofore usual tantalum and gold thermal sensing elements is avoided. The rapid response speed of thermocouples is retained even if the thermocouples are completely embedded within the enamelled layer, which may be very thin above the thermocouple, even if the contents of the container are to be highly corrosive, a particular advantage in exothermal processes. It is, of course, also possible to choose the thickness of the enamel layer over the element as desired, and to apply, localized, further coatings. If the metals of the thermocouples are not attacked by the products to be contained within the vessel, further speed of response can be obtained by slightly extending the thermocouples beyond the enamelled surface in order to provide for a direct temperature conductive contact with the contents.

The structure, organization, and operation of the invention will now be described more specifically with reference to the accompanying drawings, wherein.

Figure 1:
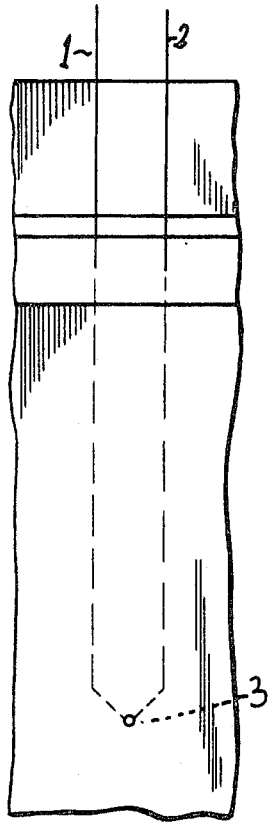
FIG. 1 is a plan view of an embodiment of the present invention.
Figure 2:
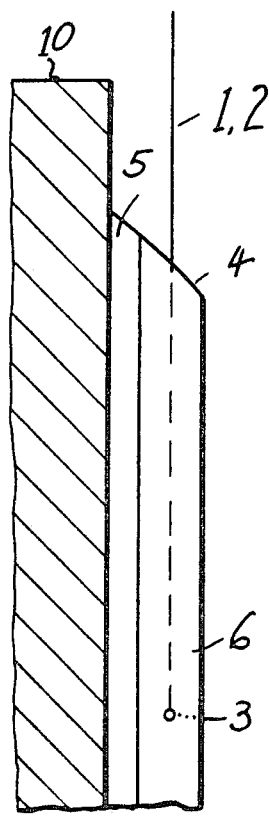
FIG. 2 is a schematic longitudinal cross sectional view of the embodiment of FIG. 1.

A pair of bare, not insulated thermocouple wires 1, 2 are applied over a base coat 5, fired unto a wall, for example steel, of the vessel the temperature of the contents of which is to be measured. The free ends of the connecting wires of the thermocouple extend beyond the edge of the enamel 4 of the enamel layer 5. Thereafter, one or more further layers of enamel 6 are applied over the base coat 5, for example by spray. Thereafter the second enamel coat is fired and fused to fuse the coatings of enamel together. If desired, additional covering layers can be applied wholly, or partly on the already enamelled steel surface. The enamel may, of course, be applied also in accordance with other processes and as well known in the art such as by powders, immersion, casting or by electrostatic application. The wall of the vessel is indicated, schematically, at 10.

Figure 3:
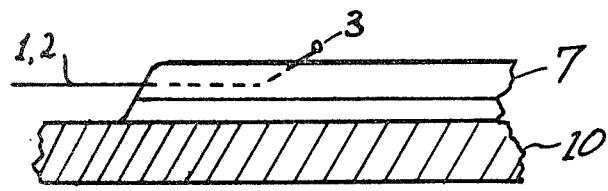
FIG. 3 is a view similar to FIG. 2 illustrating a different embodiment of the present invention and using an exposed thermocouple junction.

FIG. 3 illustrates a different embodiment in which the ends of the thermocouple wires 1, 2 extend beyond the enamel layer 7, so that the thermocouple junction 3 is exposed to the contents within a vessel, formed by outer wall 10 and the interior enamel coverings.

What is claimed is:

1. Enamelled apparatus comprising a metallic substrate and a fused enamel covering thereover, and a high sensitivity temperature measuring means thereon, comprising
    a thermocouple fused at least partly within the enamel covering and separated from the metallic substrate by a portion of said enamel covering.

2. Apparatus according to claim 1, wherein the thermocouple has a temperature-sensitive junction, the junction being embedded in the fused enamel layer applied over said substrate, and separated from said substrate by a portion of said fused enamel layer.

3. Apparatus according to claim 1, wherein the thermocouple has a temperature-sensitive junction, said junction projecting beyond the fused enamel layer in a direction away from said substrate.

4. Method of manufacturing apparatus having an enamel covering on a metal substrate combined with temperature measuring means thereon comprising
    fusing an enamel layer to said substrate;
    preliminarily securing a thermocouple to said fused enamel layer, said fused enamel layer acting as an electric insulator between said thermocouple and its connecting wires, and the metal substrate;
    covering said thermocouple, at least partly, by a further enamel layer, or further enamel layers, and fusing said further layer, or layers, to said first layer to thus embed said thermocouple at least partly in the completely fused enamel covering on the metallic substrate and fix it in position.

5. Method according to claim 4, wherein said step of covering said thermocouple includes the step of completely covering said thermocouple, including the junction thereof.

6. Method according to claim 4, wherein said step of covering said thermocouple includes the step of completely covering said thermocouple except the junction thereof.

7. Method according to claim 4, wherein said step of preliminarily securing the thermocouple to said first fused enamel layer includes the step of adhering said thermocouple to said first fused enamelled layer.

References Cited

UNITED STATES PATENTS

| | | | |
|---|---|---|---|
| 2,904,995 | 9/1959 | Obermaier | 73—359X |
| 2,975,225 | 3/1961 | Barbieri et al. | 136—233 |
| 3,006,978 | 10/1961 | McGrath et al. | 136—223X |
| 3,088,988 | 5/1963 | Menke | 136—233X |
| 3,278,324 | 11/1966 | Nelson | 106—48X |
| 3,360,404 | 12/1967 | Beckman | 136—230 |
| 3,449,174 | 6/1969 | Kleinle | 136—230X |

CARL D. QUARFORTH, Primary Examiner

H. E. BEHREND, Assistant Examiner

U.S. Cl. X.R.

136—201, 233; 117—217